G. H. McFEATERS.
ENGINE STOP.
APPLICATION FILED APR. 14, 1915.

1,301,471.

Patented Apr. 22, 1919.
6 SHEETS—SHEET 1.

WITNESSES

INVENTOR

G. H. McFEATERS.
ENGINE STOP.
APPLICATION FILED APR. 14, 1915.

1,301,471.

Patented Apr. 22, 1919.
6 SHEETS—SHEET 2.

G. H. McFEATERS.
ENGINE STOP.
APPLICATION FILED APR. 14, 1915.
1,301,471.
Patented Apr. 22, 1919.
6 SHEETS—SHEET 3.
FIG. 5
FIG. 4
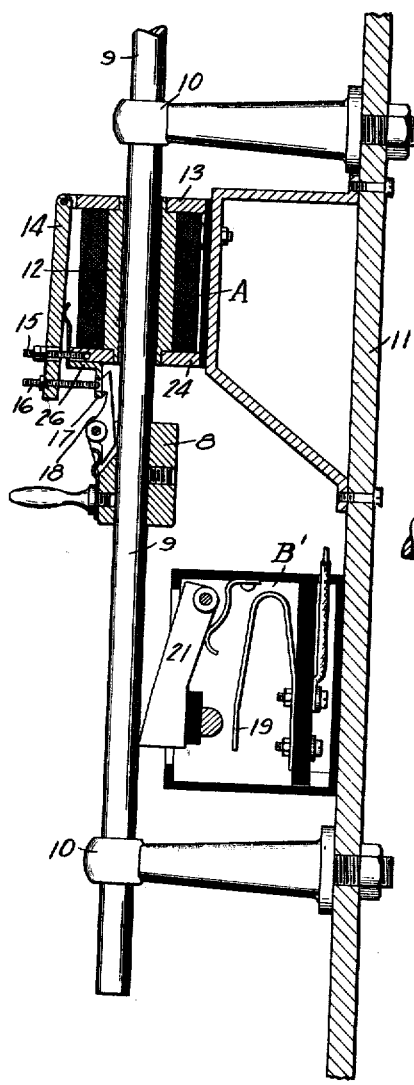
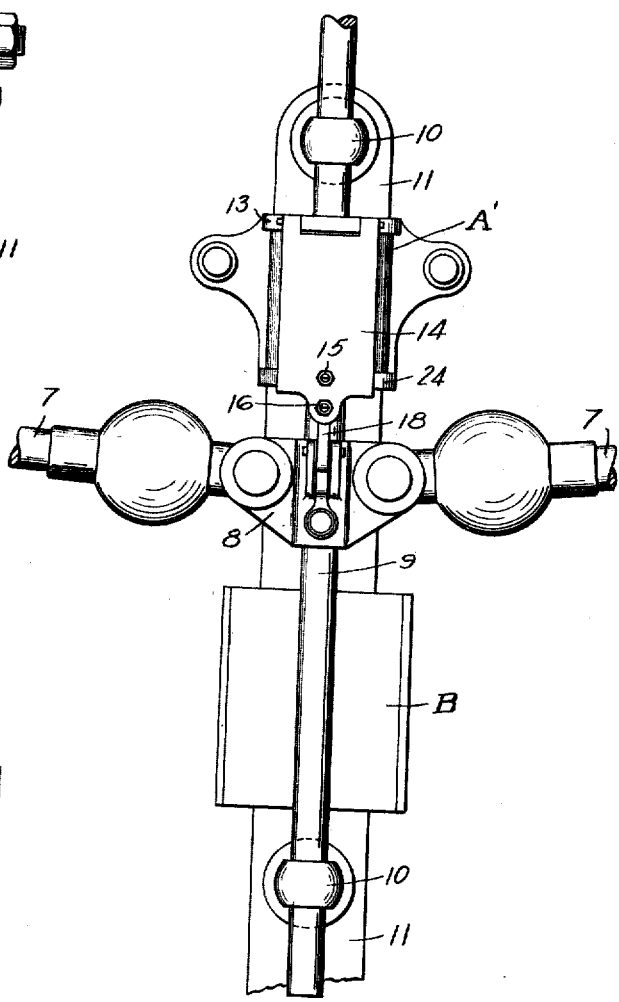
WITNESSES
INVENTOR
G. H. McFeaters
by C. C. Linthicum
his Attorney G. H. McFEATERS.
ENGINE STOP.
APPLICATION FILED APR. 14, 1915.

1,301,471.

Patented Apr. 22, 1919.
6 SHEETS—SHEET 4.

WITNESSES

INVENTOR

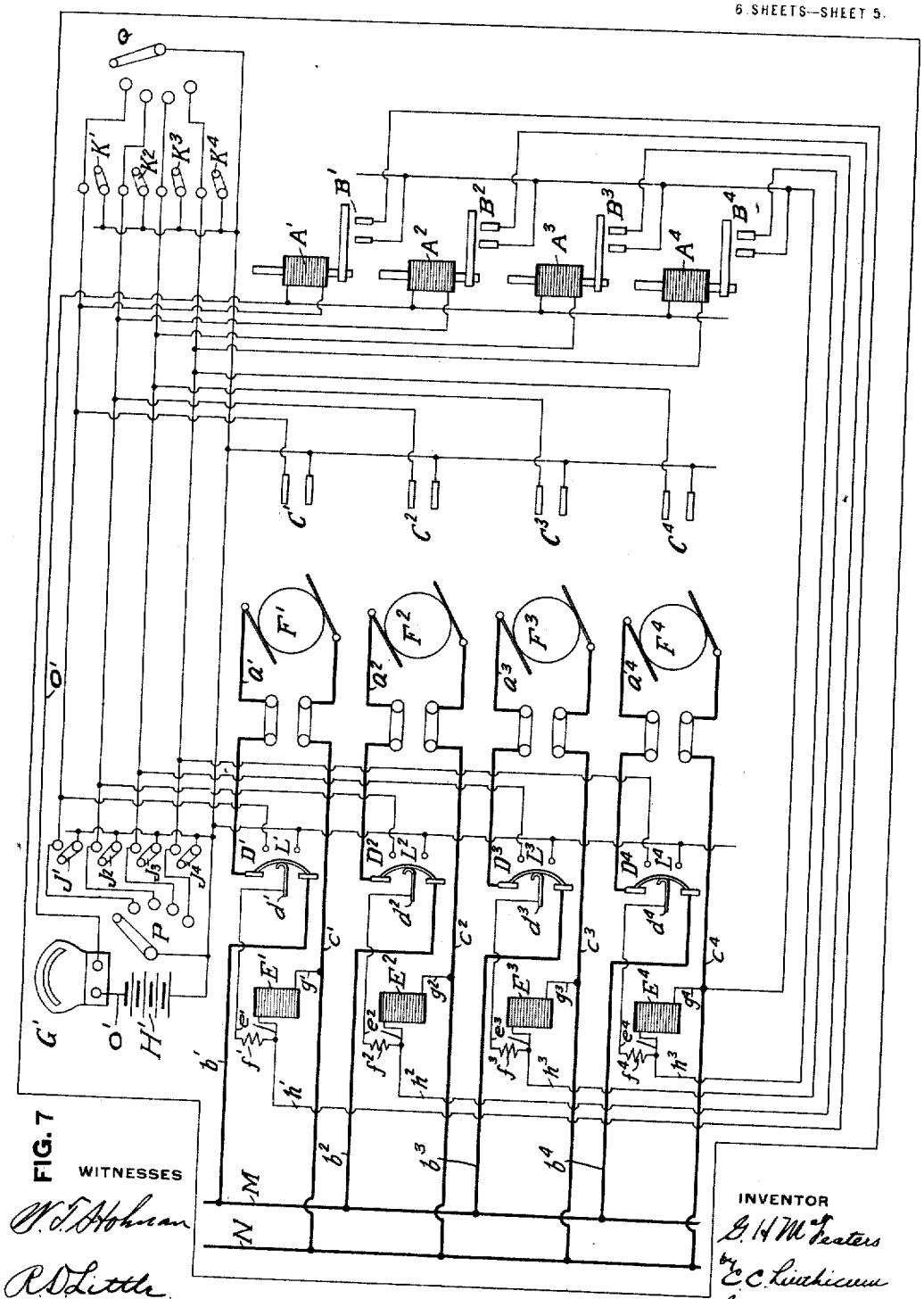

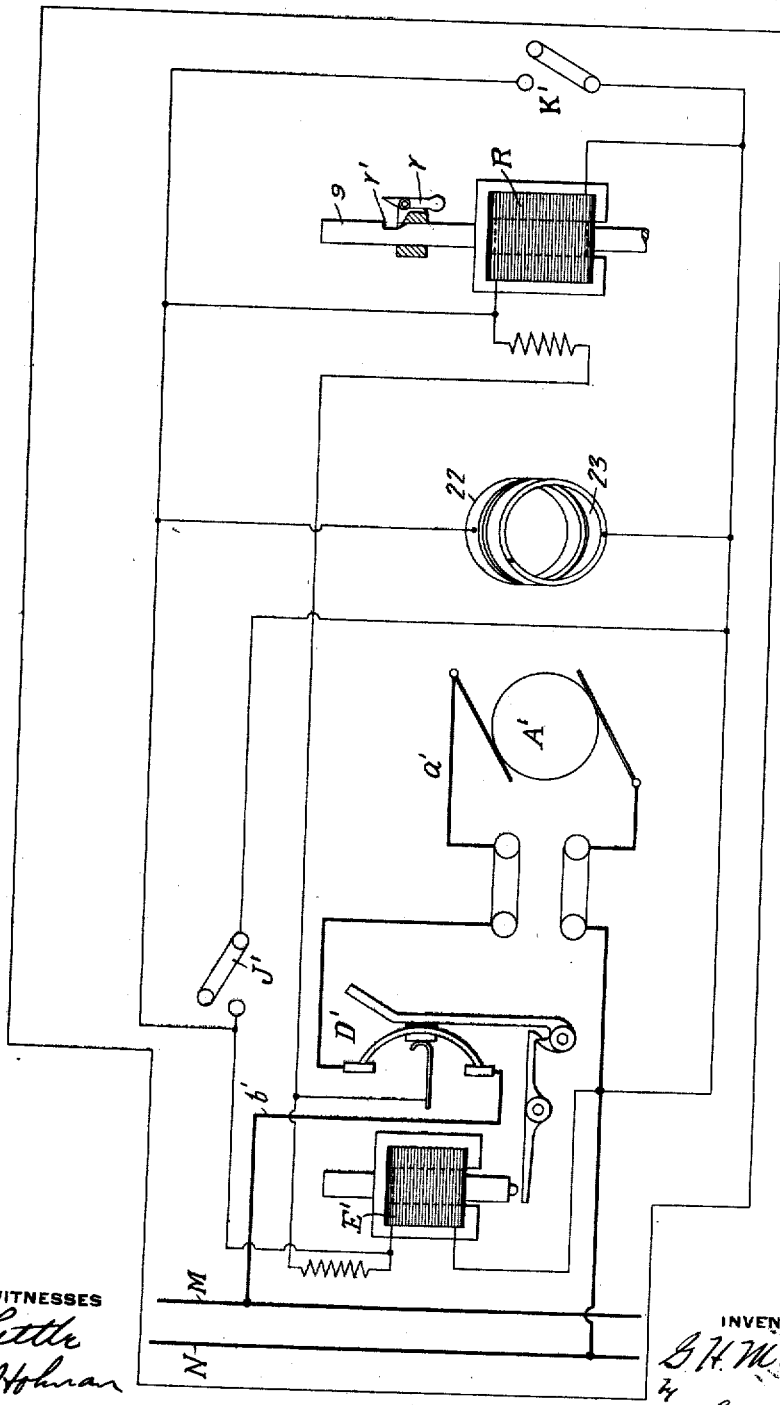

UNITED STATES PATENT OFFICE.

GEORGE H. McFEATERS, OF JOHNSTOWN, PENNSYLVANIA.

ENGINE-STOP.

1,301,471.  Specification of Letters Patent.  Patented Apr. 22, 1919.

Original application filed September 25, 1908, Serial No. 454,694. Divided and this application filed April 14, 1915. Serial No. 21,407.

*To all whom it may concern:*

Be it known that I, GEORGE H. McFEATERS, a citizen of the United States, and resident of Johnstown, in the county of Cambria and State of Pennsylvania, have invented certain new and useful Improvements in Engine-Stops, of which the following is a specification.

My invention relates to the construction and arrangement of an automatic stop for steam engines, and more particularly for steam engines used in driving the generators of electric power plants of the class shown and described in Patent No. 1,140,694, dated May 25, 1915, of which this application is a division.

One object of my invention is to provide an engine stop of improved construction having novel means whereby the engine and a generator, or series of generators driven thereby are stopped at will from any one of a series of separated or remotely located points in the power house or power plant.

Another object of my invention is to provide an engine stop having improved means whereby any one of a series of independently driven generators will be stopped simultaneously with stopping of the engine driving such generator, and the possibility of continued rotation of the generator by power supplied thereto from other generators in the same circuit is avoided and overcome.

Still further objects of my invention, as will become more fully apparent hereinafter, consist in the novel construction and arrangement of parts to be described in this specification and specifically pointed out in the appended claims.

Referring now to the accompanying drawings forming part of this specification, Figure 1 is a side elevation of the cylinder end of a Corliss engine equipped with my improved engine stop.

Fig. 4 is a front elevation of the rod releasing mechanism.

Fig. 5 is a vertical sectional side elevation of the same.

Fig. 7 is a similar diagram showing the connections for four engines and four generators.

Fig. 8 is a diagram showing a modified form of releasing mechanism in which the releasing mechanism is held in running position by means of a solenoid.

Figure 1:
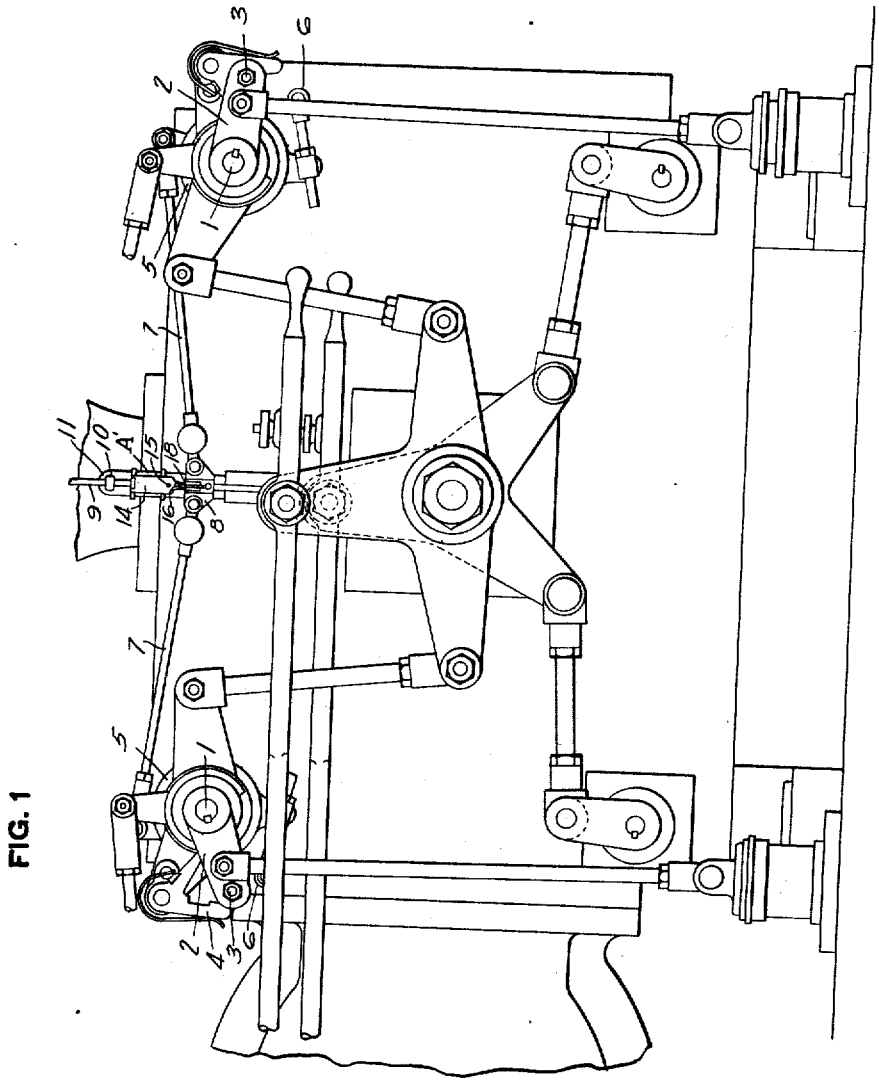

The valve mechanism on one side of the cylinder being a duplicate of that on the other side, the connections for but one side need be described.

In the drawings, the numeral 1 designates a valve stem to which a crank arm 2 is connected which is provided with a projection 3, adapted to be engaged by a lifting pawl 4 to rotate the valve stem 1 in opening the valve and admitting steam to the engine cylinder. Such apparatus being old and well known in the art, its construction and the manner in which it operates are not described in detail.

Figure 2:
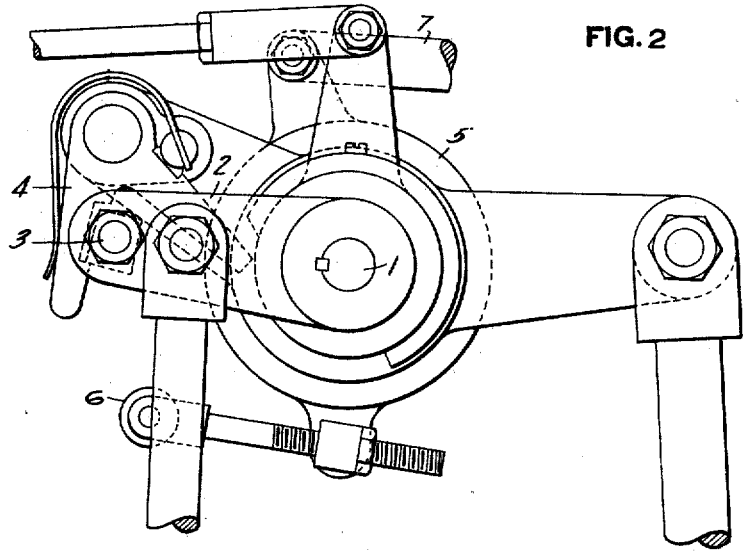
Fig. 2 is a detail side elevation of a valve stem, guard, and lifting pawl, the lifting pawl being shown in engagement with the valve stem crank arm.
Figure 3:
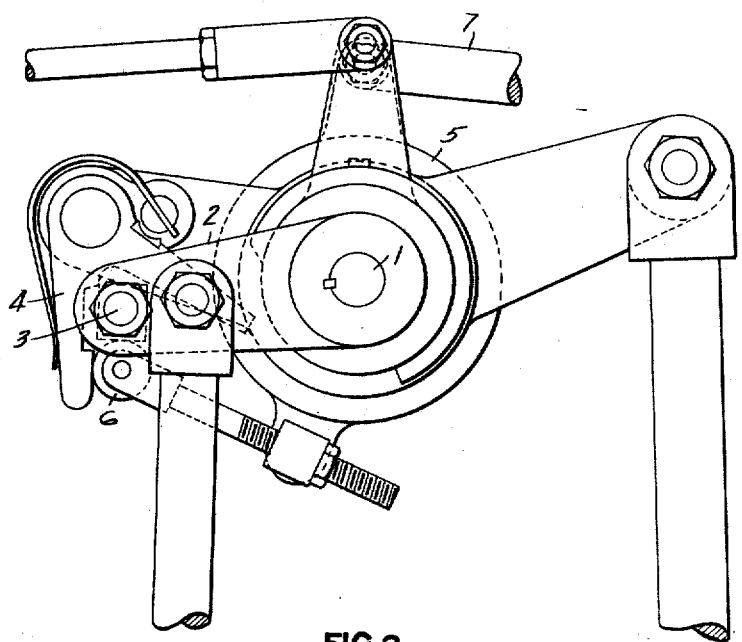
Fig. 3 is a view similar to Fig. 2, showing the guard as alined with the lifting pawl to prevent engagement of the lifting pawl with the crank arm of the valve stem.

Loosely mounted outside the valve stem bearing is a ring 5 to which the adjustable guard 6 and the link 7 are connected. When the ring 5 and guard 6 are in the position shown in Figs. 1 and 2 the lifting pawl 4 is free to engage the projection 3 and rotate or rock the valve stem, but when the ring is turned into the position shown in Fig. 3, the guard 6 is in alinement with the pawl 4 so as to prevent engagement of the pawl with the projection 3 and avoid the necessity of maintaining the admission valve in its closed position.

The other end of the link 7 is pivotally connected to the cross head 8 secured to the rod 9. The rod 9, which is made of an insulating or non-magnetic material, is mounted so as to slide in the bearings 10, 10, and the bearings are rigidly secured by a bracket 11 to the steam chest of the engine.

An electro-magnet A' is connected to and insulated from the bracket 11, and is provided with a soft iron core 12 surrounding the rod 9, and the magnet is provided with the usual pole pieces 13 and 24. Pivotally connected to the pole piece 13 is an armature 14 having at the lower depending end thereof the adjustable stop 15 and adjustable tripping screw 16. Secured to the pole piece 24 is an angular member 26 having a notch therein forming a hook 17 on the lower end of the vertical leg thereof.

Pivotally secured to the cross head 8 is a spring catch or detent 18 which engages the hook 17 when the rod 9 is in its elevated position (that shown in Figs. 4 and 5) which is the normal position of the rod 9, when the engine is in operation.

Fastened to the bracket 11 is a switch B' having contact fingers 20, and a swinging bridge piece 21 which when moved inwardly will bridge the space and electrically connect the fingers 20.

When current is passed through the coil of the magnet A' the armature 14 will be energized and the tripping screw 16 on the end of the armature will move and disengage the spring catch 18 from the hook 17, so as to release and permit the rod 9 to drop by gravity. The rod in dropping carries the cross head 8 with it and the cross head, through the medium of the link 7 causes the ring 5 to rotate on the valve stem 1 and bring the guard 6 within the path of movement of the lifting pawl 4 of the engine valve mechanism, and cut off the steam supply to the engine cylinder. When the rod 9 drops the cross head 8 strikes the bridge piece 21 and closes the circuit through the contact fingers 20, 20, for a purpose to be described.

Figure 6:
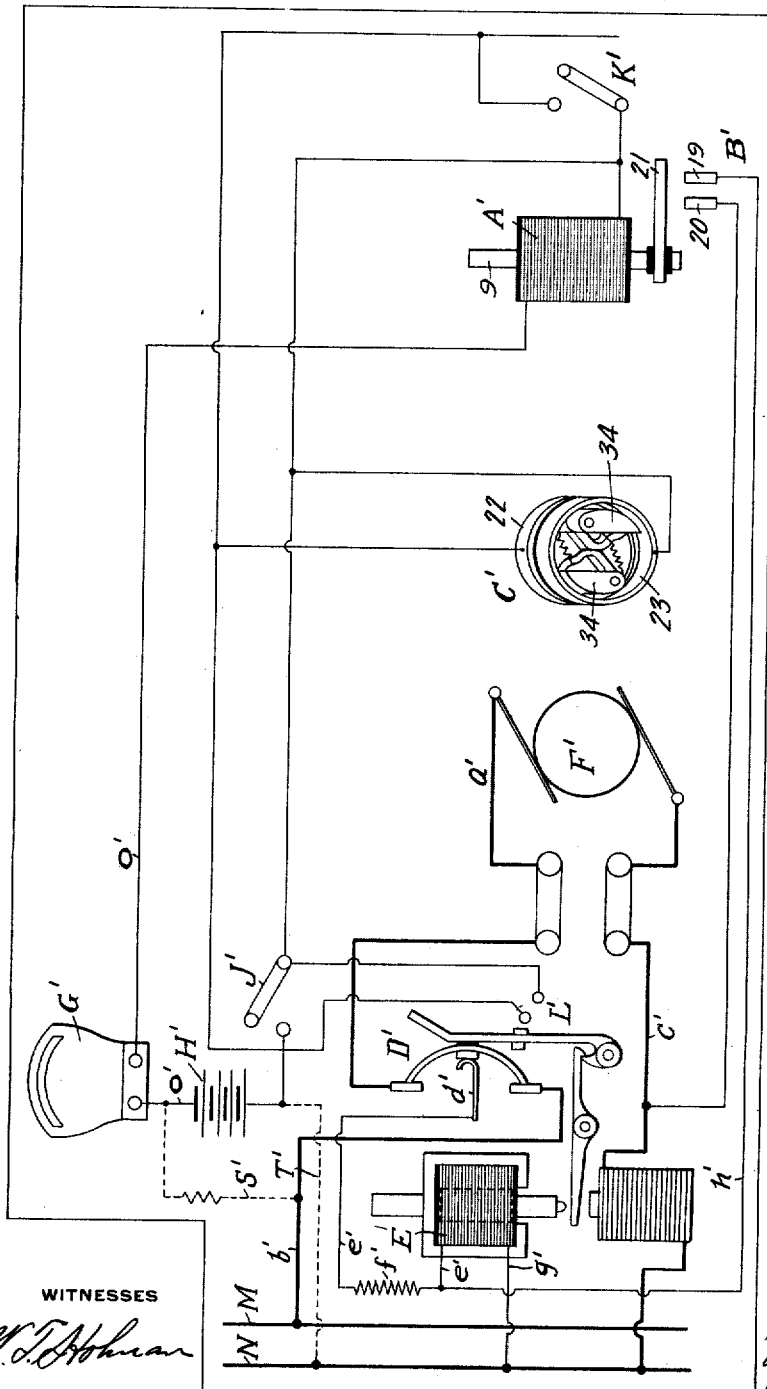
Fig. 6 is an electrical diagram showing all of the connections for one engine and a generator driven thereby, and the releasing mechanism illustrated in Figs. 4 and 5.

Referring now to Fig. 6, C' designates a rotary governor switch which is connected to the engine so as to be rotated thereby, this switch comprising stationary metallic rings 22 and 23. The numerals 34, 34, designate rotatable swinging bridge pieces which are thrown outwardly by centrifugal force, and, when the engine has reached a predetermined speed, the bridge pieces 34 will bridge the rings 22 and 23, thereby closing the circuit between these rings.

The electrical connections from the generator F' are as follows: The current flows from the generator F' through the line $a'$, the circuit breaker D', and wire $b'$, to the line M, and returns from the line N through the wire $c'$ to the generator F'. A contact finger $d'$ is in electrical connection with the circuit breaker D', and when the circuit breaker is closed current will flow through this finger to the solenoid E' and through the wire $e'$, and resistance $f'$ in this line. The other side of the solenoid E' is connected by the wire $g'$ with the negative side of the generator.

The wire $h'$ taps the line $c'$ between the solenoid E' and the resistance $f'$, and leads to the contact finger 19 of the switch B', and the contact finger 20 of the switch B' is connected to the negative side of the generator F'.

Leading from the battery H' to one side of the magnet A' is the line O' in which is placed the ammeter G'. The other side of the magnet A' is in electrical connection with one pole of each of the switches J', K', L', and the ring 22 of the centrifugal switch $c'$. The other pole of each of the switches J', K', L', and the ring 23 of the centrifugal switch C' are in electrical connection with the other pole of the battery H'.

The battery H' can be dispensed with by applying current from the generator line by tapping the two sides of the generator and placing resistance in the line, as shown by the dotted lines S' and T' in Fig. 6.

When the engine is in operation the various parts are in position as shown in the drawings. Should it be desired to stop the engine, one of the switches J' or K' is closed, which enables current to pass through the coil of the electro-magnet A', and causes the rod to be released. The movement of the released rod 9 will throw the guard 6 into the path of movement of the pawl 4, and also will close the switch B'. Closing the switch B' will close the circuit through the solenoid E', which will open the circuit breaker D' and disconnect the generator F' from the line at the same time that the steam supply is cut off from the steam engine. Opening of the circuit breaker at the same time the steam supply is shut off is essential where there is more than one generator connected to the line, as if two or more generators are connected to the line, each having its own engine, and one engine is stopped without opening the circuit breaker of its generator, such generator will act as a motor supplied with power from the other generator, so that the engine would continue in operation, but with the connections as illustrated such occurrence is prevented.

Should for any reason the circuit breaker be opened, as by abnormal load, the opening of such circuit breaker will stop the engine through the medium of the switch L', which will be closed in such case by the opening of the circuit breaker. Should the speed of the engine get above the predetermined limit of safety, the switch C' closes and current is supplied to the magnet A' which causes the engine to stop and the circuit breaker D' to open in the same manner as when current from the battery H' is passed through either of the hand switches J' or K'.

In Fig. 7 the various connections and switches illustrated in Fig. 6, as shown are applied to four engines, and connected in these circuits are hand switches P and Q, each having four contact points. Each of the contact points of each switch is connected to the line leading from the negative side of each of the electro-magnets of each of the four engine stops, while the other pole of the switches P and Q is connected to the other pole of the battery H'.

The various parts are given the same reference letters as like parts in Fig. 6, with the numerals 2, 3, and 4 added to the letters to designate the various sets.

When either of the switches P or Q is moved to engage with the four contact points, the four engines will be stopped successively; and when either of the hand switches J', J², J³, J⁴, K' K², K³, K⁴, is closed, the electro-magnet in each circuit will be operated, stopping its engine and opening or throwing out the circuit breaker in its line, as has been described hereinbefore.

In Fig. 8 another form of wiring is illustrated in which the rod 9 is held in its elevated position by a solenoid R, so that when current is shunted around this solenoid the rod 9 will drop, and in dropping will stop the engine, as previously described. In this case, the same switch and circuit breaker constructions are used as shown in Fig. 6, and current from the generator A' to line passes through the circuit breaker D, as in Fig. 6. The circuit to the solenoid E' also is the same as illustrated in Fig. 6, while the circuit to the solenoid R is in multiple with the solenoid E'. The lines to one side of each of these solenoids E' and R are in electrical connection with one pole of each of the various switches, and when either of the said switches is closed the current will be shunted around both the solenoid E' and the solenoid R, the solenoid E' throwing the circuit breaker D', while releasing of the rod 9, by the shunting of the solenoid R will stop the engine.

In the construction of Fig. 8, a lever r is pivoted to the top bearing 10 on the bracket 11, and the rod 9 is provided with a notch or indentation. Should the engine to be started be provided with the stop illustrated in Fig. 8, the rod 9 is raised and the lever r is in engagement with the notch r' to hold the rod 9 in its elevated position and keep the guards 6 out of the path of the lifting pawls 4, and as soon as sufficient current is generated by the generator A' the rod 9 will be raised by the solenoid R so as to release the lever r from the notch r', and the rod 9 will be free to drop by gravity when the lever r is actuated by the energized solenoid R.

Should the engine be provided with the stop as illustrated in the other drawings, the rod 9 is raised until the spring catch 18 engages the hook 17, which will remove the guards 6 from the path of the lifting pawls 4, after which the throttle can be opened to start the engine.

The advantages of my invention will be appreciated by those skilled in the art. It will be readily seen and understood from the foregoing description and the drawings that an engine stop is provided which is under the control of the engineer from various points, and a stop is provided whereby one engine of a series, or the engines comprising the whole plant, may be shut down or stopped almost instantly. It will also be readily seen that an automatic stop is provided which will shut down or stop the engine when the speed of the engine passes a pre-determined or safe speed, and when the circuit breaker is thrown or opened.

Modifications in the construction and arrangement of the parts may be made without departure from my invention as defined in the appended claims.

I claim:—

1. In a power plant the combination of a generator having an overload circuit breaker, an engine for driving the generator having a centrifugal governor, an engine stop to which said governor is operatively connected, and electrical means connecting said circuit breaker and engine stop, said means being adapted to stop the engine and the generator when either the governor or the circuit breaker is actuated.

2. In a power plant the combination of a generator having an overload circuit breaker, an engine for driving the generator having a centrifugal governor, an engine stop to which said governor is operatively connected, and electrical means connecting said circuit breaker and engine stop and having a hand-switch thereon, said means being constructed and arranged to stop the engine and the generator when either the governor or the circuit breaker is actuated or when the hand-switch is closed.

3. In a power plant the combination with a plurality of generators connected through a work circuit, each generator having an overload circuit breaker and a separate engine for operating each generator, each engine having a centrifugal engine stopping mechanism, of electrical means connecting the circuit breaker ad engine stop for each generator, said means having a hand-operated switch and being adapted to actuate the engine stop and open the circuit breaker when the hand-switch is closed, and to actuate one when the other is actuated in the operating movement of said engine stop or circuit breaker.

4. In a power plant the combination with a plurality of generators connected through a work circuit, each generator having an overload circuit breaker, a separate engine for operating each generator, each engine having a centrifugal engine stopping mechanism, of electrical means controlling the operation of the circuit breaker of each generator and the engine stop of its engine, said means being adapted to stop each generator and its engine when actuated either by opening of the circuit breaker or by the operation of the engine stopping mechanism.

In testimony whereof I have hereunto set my hand.

GEORGE H. McFEATERS.

Witnesses:
W. MILT. BROWN,
H. W. SMITH.

Copies of this patent may be obtained for five cents each, by addressing the "Commissioner of Patents, Washington, D. C."